United States Patent [19]
Crepin

[11] Patent Number: 4,632,336
[45] Date of Patent: Dec. 30, 1986

[54] LATERAL GAS JET PILOTING DEVICE

[75] Inventor: Roger Crepin, Ville D'Avray, France

[73] Assignee: Brandt-Armements, Paris, France

[21] Appl. No.: 561,801

[22] Filed: Dec. 15, 1983

[30] Foreign Application Priority Data

Dec. 17, 1982 [FR] France ................ 82 21227

[51] Int. Cl.[4] .................. F42B 15/033; F02K 9/80
[52] U.S. Cl. .................... 244/3.22; 60/229; 239/265.27
[58] Field of Search ............. 244/3.22; 239/265.25, 239/265.27; 60/229

[56] References Cited

U.S. PATENT DOCUMENTS

| | | | |
|---|---|---|---|
| 4,017,040 | 4/1977 | Dillinger et al. | 239/265.27 |
| 4,211,378 | 7/1980 | Crepin | 244/3.22 |
| 4,441,670 | 4/1984 | Crepin | 244/3.22 |

FOREIGN PATENT DOCUMENTS 0060726 9/1982 European Pat. Off. .
0064433 11/1984 European Pat. Off. .
2386802 11/1978 France .

*Primary Examiner*—Charles T. Jordan
*Assistant Examiner*—Ted L. Parr
*Attorney, Agent, or Firm*—Oblon, Fisher, Spivak, McClelland & Maier

[57] ABSTRACT

The invention provides a lateral gas jet piloting device comprising at least one pair of diametrically opposite nozzles and a sliding bar comprising bistable pneumatic means ensuring reciprocal movement thereof so that the ends of said bar close alternately coupling ducts disposed between the nozzles and an external gas generator.

11 Claims, 9 Drawing Figures

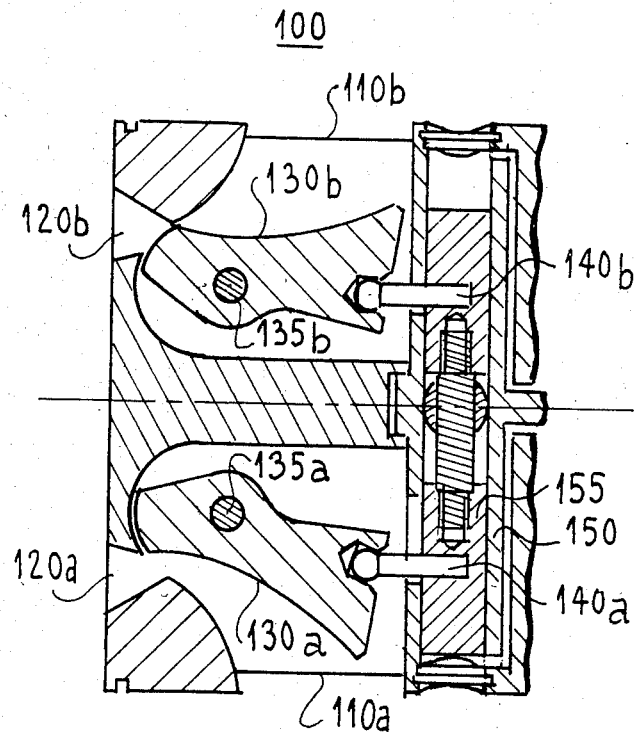
FIG_1 PRIOR ART
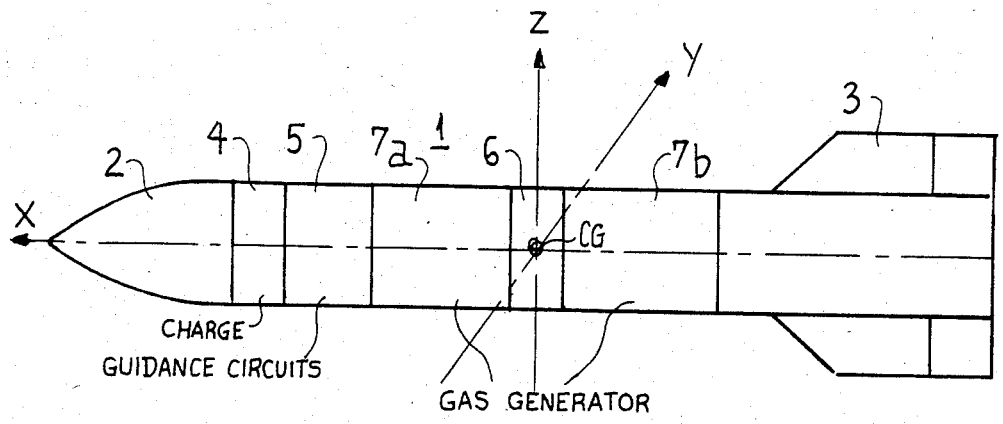
FIG_2

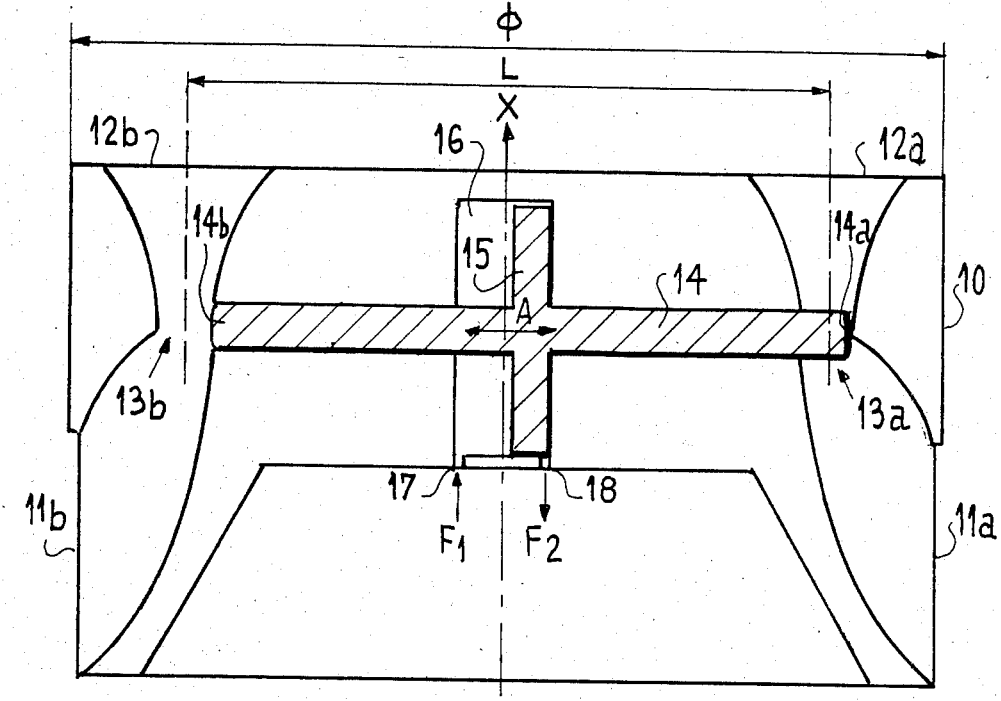
FIG_3
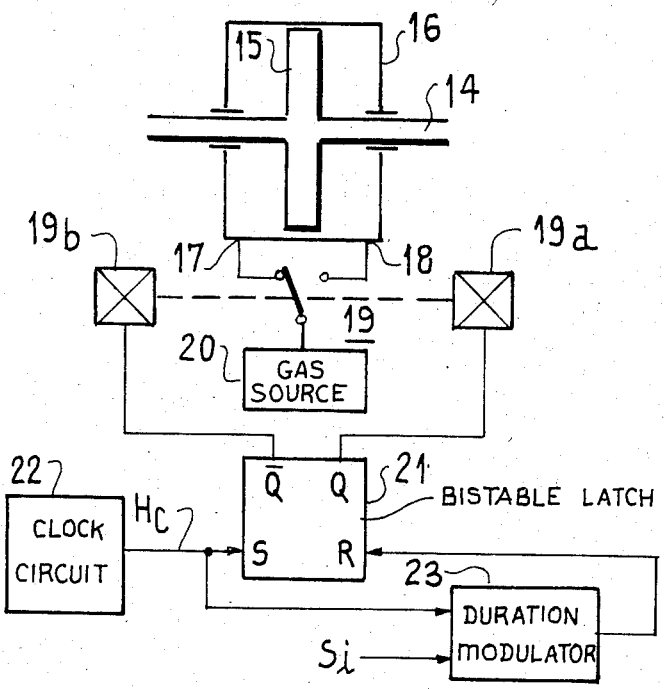
FIG_4

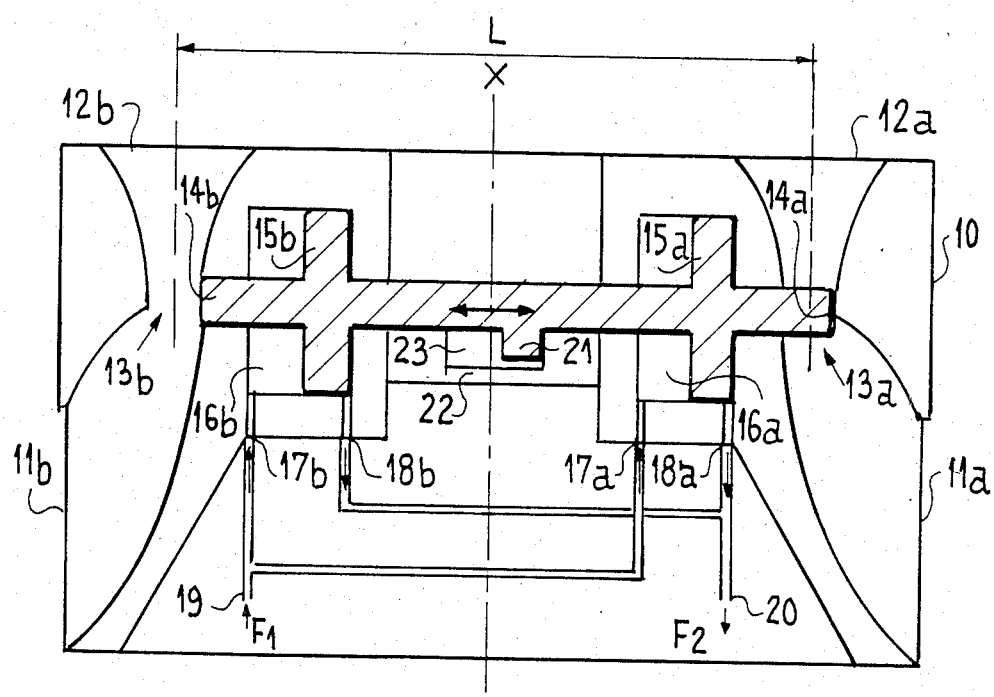
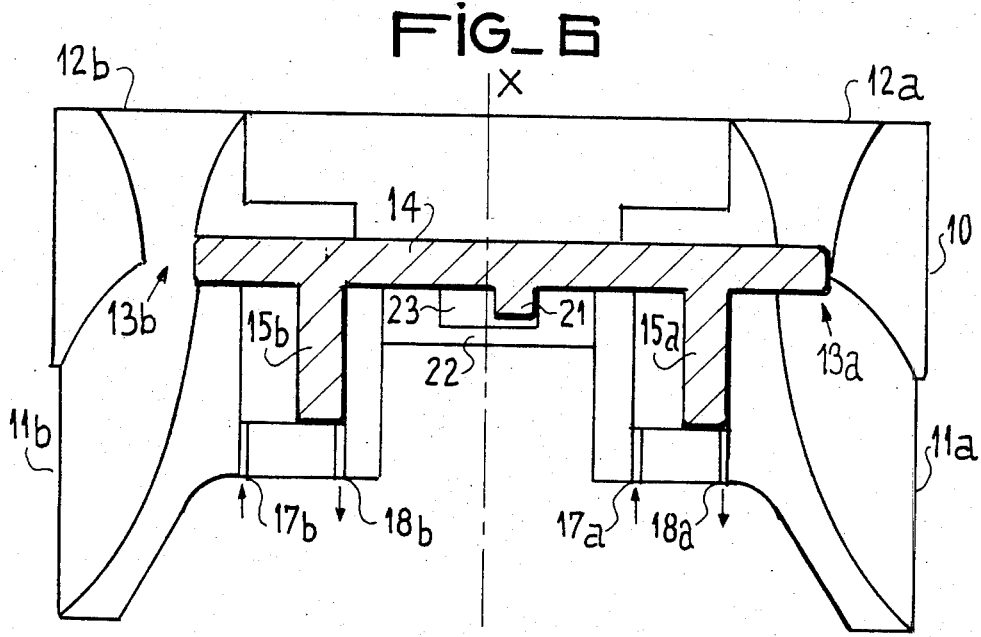

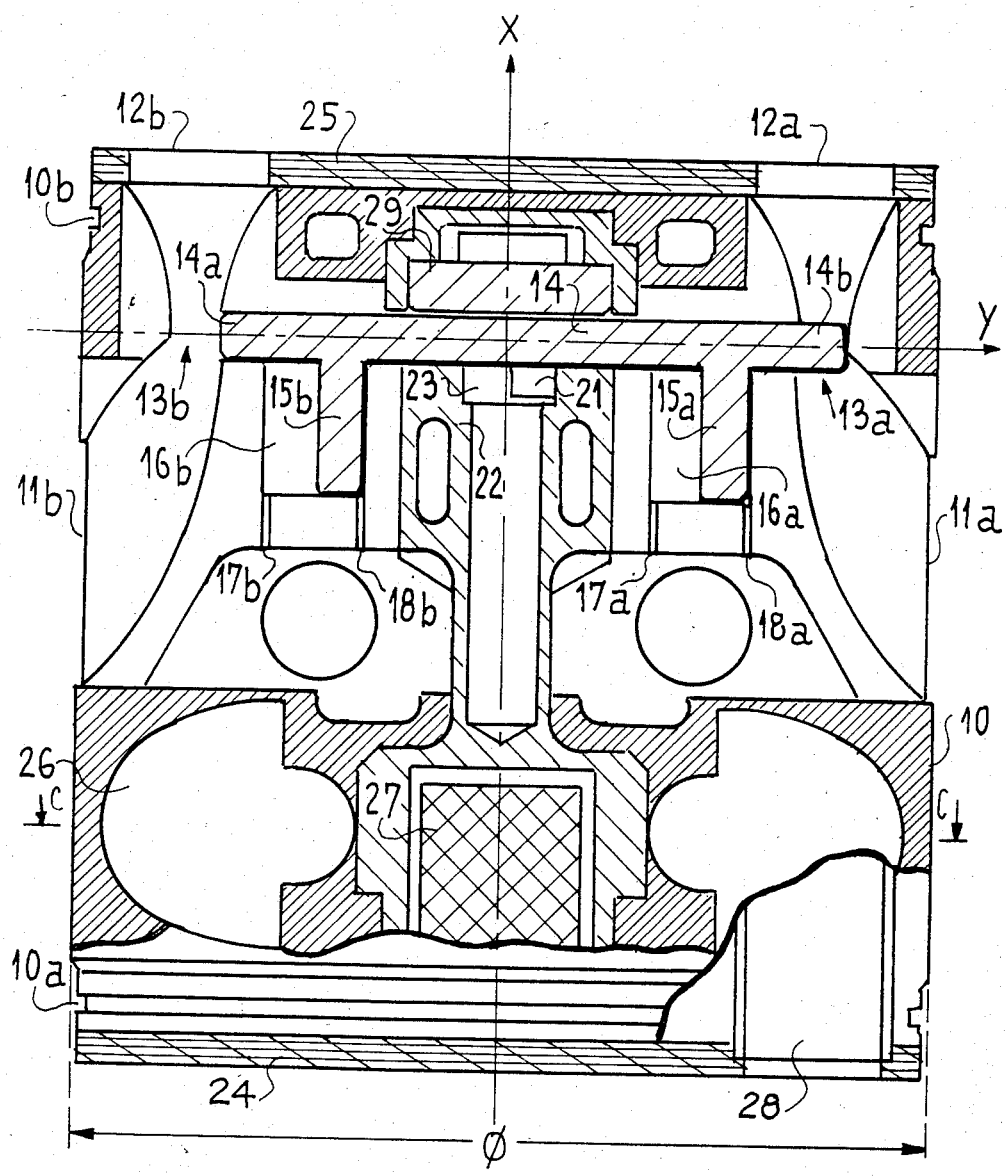

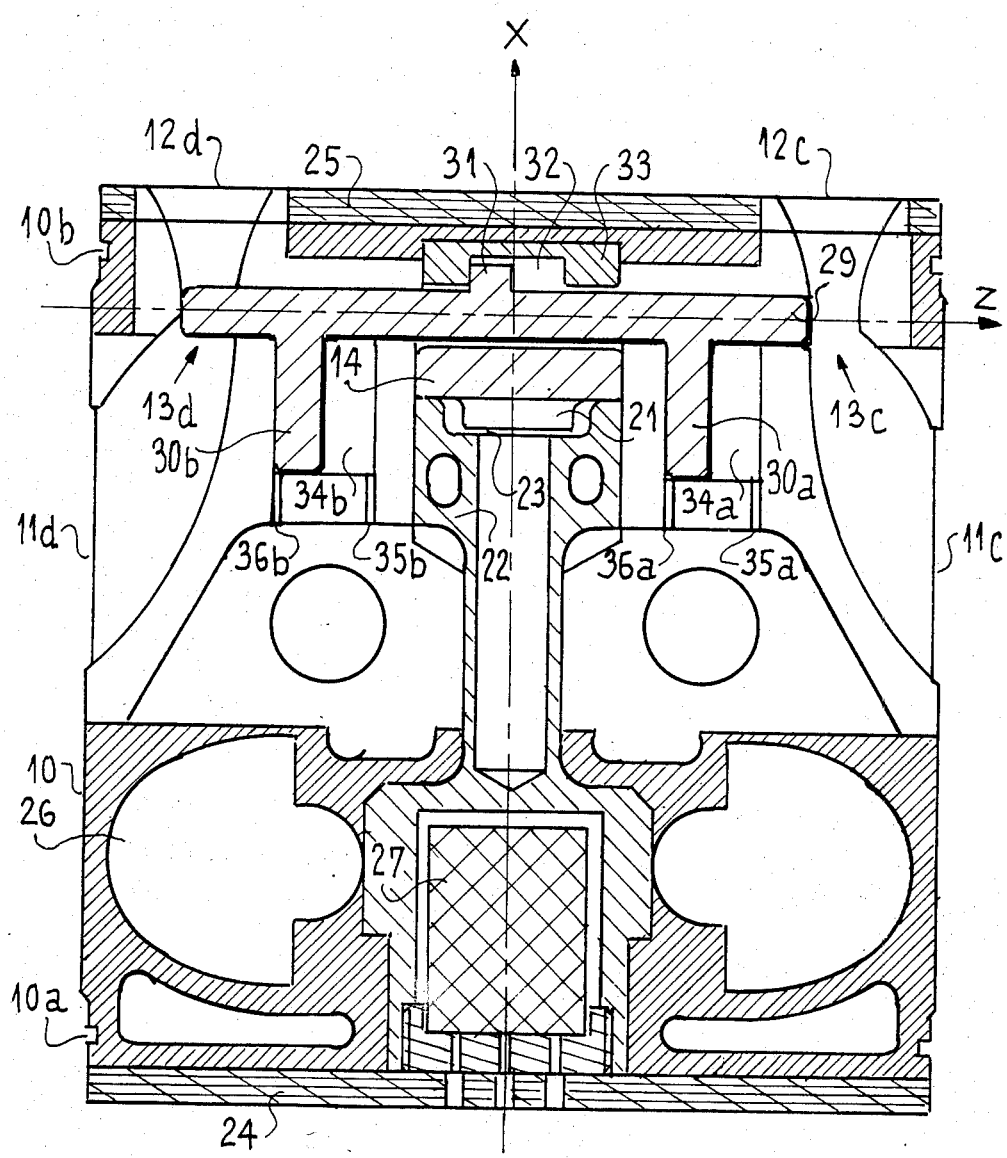
FIG_8

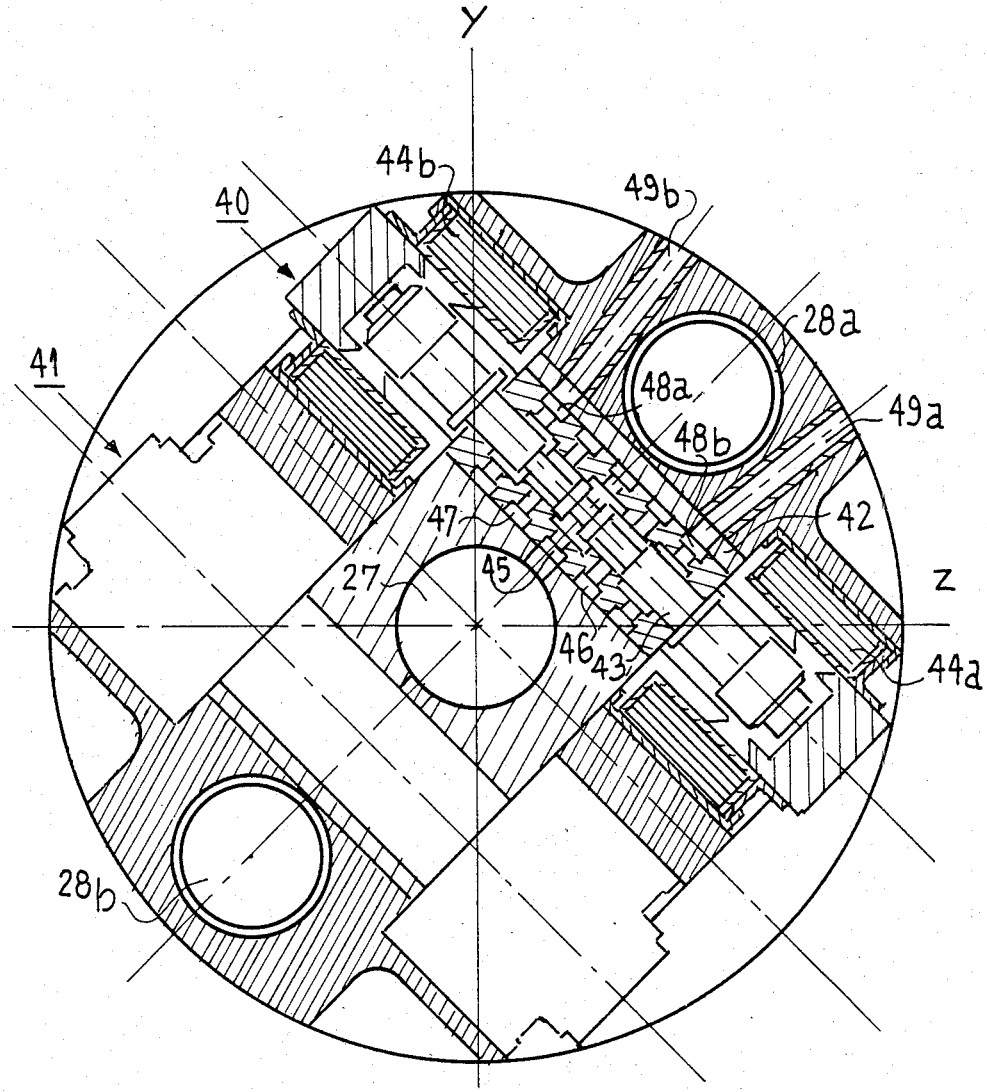

LATERAL GAS JET PILOTING DEVICE

BACKGROUND OF THE INVENTION

1. Field of the Invention

The invention relates to guided missiles, and concerns more particularly a lateral gas jet piloting device for such missiles.

2. Description of the Prior Art

The maneuvering ability of offensive targets is constantly being improved, such that the terminal trajectory error, or passing distance, of the missiles increases accordingly. In a conventional guided missile which uses a piloting device of an aerodynamic type requiring an incidence measurement for modifying its flight path, the time consant related to the aerodynamic response is of the order of a few tenths of a second. In comparison, a lateral gas jet piloting device which creates a system of forces applied to the center of gravity of the missile so as to ensure the direct movement of the center of gravity with respect to its path, time constants less than a tenth of a second are possible.

It is known that the path or trajectory of a missile may be modified by ejection of a material jet whose flowrate and direction are varied so as to create a given thrust force. This thrust force may be obtained from numerous energy sources, such a liquid propergols. Whereas lateral gas jet piloting devices using liquid propergol energy sources provide flexible operation because these energy sources may be activated or deactivated intermittently on demand, they present the drawback of excessive complexity, a certain temperature sensitivity and especially of being difficult to store. Therefore, in the piloting device considered here, the energy souce is formed by solid propergol whose combustion provides a continuous gas flow. One difficulty inherent in the use of a solid propergol follows from the fact that once the combusion has been completely initiated the combusion pressure must be maintained within limits which vary little ; a second difficulty results from the fact that, since the flow rate of the gas flow is continous the resultant of the thrust forces applied to the missile must be zero in the absence of piloting order.

A lateral gas jet piloting device comprises at least one pair of diametrically opposite nozzles, but more generally two pairs of nozzles orientated in two mutually orthogonal piloting planes, these nozzles being fed from an energy source supplying a gas flow with substantially constant flowrate, and routing means are included for modifying the differential gas flow between the nozzles so as to create a resultant thrust force of given magnitude and direction.

From European patent application No. 82 400 634 0 filed in the name of the present Applicant, a lateral gas jet piloting device is known which attains the above-mentioned objectives. This device comprises two pairs of nozzles, each of these pairs of nozzles is oriented in the piloting planes of the missile. The differential gas flow in each of the pairs of nozzles is controlled by a switch formed of two rotatably mounted vanes placed in the gas ducts of the nozzles, these vanes are mechanically coupled to a pneumatic double-acting cylinder and allow one and the other of the nozzles to be cleared alternately.

This known piloting device, although it may operate satisfactorily, present limitations when it is desired to construct a piloting device taking up reduced space and having a short response time, while striving for a manufacturing cost adapted to the cost of the missile.

SUMMARY OF THE INVENTION

To overcome the above limitations, the present invention provides a piloting device comprising at least one pair of diametrically opposite nozzles, which nozzles are coupled to a gas generator by separate ducts, and a sliding bar comprising bistable pneumatic means so that its ends close alternately the ducts coupling the nozzles to the gas generators.

BRIEF DESCRIPTION OF THE DRAWINGS

Other characteristics of the invention will appear from the detailed description, given by way of non limiting example, made with reference to the accompanying drawings in which:

FIG. 1 shows a lateral gas jet piloting device of the prior art;

FIG. 2 illustrates a guided missile comprising a lateral gas jet piloting device;

FIG. 3 shows one embodiment of a piloting device in accordance with the invention;

FIG. 4 shows, in schematical form, one embodiment of the electro-pneumatic means controlling the sliding bar;

FIG. 5 shows another embodiment of the pneumatic means for moving the sliding bar;

FIG. 6 shows yet another embodiment of the pneumatic means for moving the slide bar;

FIG. 7 shows one method of constructing a first piloting plane provided by the device;

FIG. 8 shows one method of constructing a second piloting plane provided by the device; and FIG. 9 shows one method of constructing a servo-valve for controlling the pneumatic means moving the sliding bar.

DESCRIPTION OF THE PREFERRED EMBODIMENTS

FIG. 1 shows in a sectional view, through one of the two piloting planes, of the lateral gas jet piloting device described in document EP No. 82 400 634 0 already mentioned. This device 100, in each of the piloting planes, comprises a pair of diametrically opposite nozzles 110a and 110b, each of the nozzles is coupled by a gas duct to a pressurized gas source which supplies a gas flow to the inlet ports 120a and 120b. This piloting device also comprises two switches for independently modifying the differential flowrate of each of the pairs of nozzles. A switch comprises two mobile vanes 130a and 130b which form part of one of the walls of the gas ducts of the nozzles. These mobile vanes rotatable about fixed shafts 135a and 135b are connected mechanically, by links 140a and 140b, to a double-acting cylinder 150 thus forming a deformable parallelogram mechanism. The movement of piston 155 of cylinder 150 allows the nozzles of the device to be closed alternately. With this type of mechanism, it is possible to imbricate the two pairs of nozzles and their gas flow switch orthogonally.

FIG. 2 shows a guided missile having a lateral gas jet piloting device. This missle 1, with longitudinal axis X, includes a self-guidance means 2 situated in the front of the missile body; an aerodynamic tail unit 3 which may possibly be used for controlling the roll attitude of the missile about its longitudinal axis X ; a military charge; circuits 5 for processing the guidance signals supplied by the self-guidance means and for elaborating piloting orders in a piloting section 6 situated close to the center of gravity CG of the missile, this piloting section including two pairs of diametrically opposite nozzles orientated in the transverse piloting planes Y and Z of the missile and means for controlling the differential gas flow through these nozzles and, finally, a gas generator 7a and 7b of the symmetrical type for limiting the movement of the center of gravity of the missile during combusion of the propergol. The nozzles may possibly be slanted rearwardly of the missile so as to supply, complementarily to the lateral thrust forces, a longitudinal thrust force for maintaining the moving speed of the missile over its flight path.

FIG. 3 shows, in a simplified sectional view, one embodiment of a gas jet piloting device in accordance with the invention, this embodiment is limited to one piloting plane. The piloting device comprises:

a cylindrical body 10 of diameter $\phi$ and with longitudinal axis X corresponding to the longitudianl axis X of the missile; this body forms section 6 of the missile shown in FIG. 2, two nozzles 11a and 11b which are diametrically opposite and open into the outer face of the body, these nozzles are coupled to a gas generator (not shown) by gas intake ducts, these gas ducts comprise inlet ports 12a and 12b and nozzle throats 13a and 13b rectangular in section whose between-axis distance L is perfectly defined, a sliding mobile bar 14 which is free to move with a reciprocating movement indicated by the arrow A, the length of this bar being substantially equal to the distance L between the axes of the nozzle throats and its ends 14a and 14b, also rectangular in section, form valves for closing the nozzle throats 13a and 13b.

The sliding bar 14 is provided in its middlepart with a disk 15, or piston, which fits into a cavity 16 inside which it may freely slide. The cavity comprises two inlet/outlet orifices 17 and 18, which are fed alternately with a pressurized control fluid for creating on the faces of the piston a reciprocating thrust force and causing the corresponding movement of the sliding bar 14. The piston and the cavity are manufactured accurately so as to obtain free movement of the piston and conjointly a very small leak of the control fluid between the inlet/outlet orifices and between these orifices and the outside of the cavity. The speed of movement of the bar is conditioned by the thrust force applied to the faces of piston 15, this thrust force is proportional to the product of the pressure of the control fluid multiplied by the effective section of the piston. The control fluid, a first flow direction of which is indicated by arrows $F_1$ and $F_2$, is switched periodically to the inlet/outlet orifices in an "all or nothing" operating cycle whose cyclic ratio may be varied as a function of the order signal supplied by the guidance section of the missile. This cyclic ratio corresponds to the ratio of the time periods during which the control fluid flows in the first direction indicated by arrows $F_1$ and $F_2$ then in the opposite direction. Thus, when this cyclic ratio is equal to unity, the differential flowrate of the gas flow passing through the opposed nozzles has a zero value, consequently the resultant of the lateral thrust forces applied to the missile also has a zero value. Conversely, when the value of this cylic ratio is different from unity, the differential flowrate of the gas flow leaving the opposite nozzles has a non zero value, the result being a lateral thrust force applied to the missile and corresponding modification of the flight path thereof. It may be noted that the relative position of piston 15 on bar 14 is not necessarily the one shown in the figure, but that it may be offset towards one of the ends of this bar thus allowing, if need be, a second sliding bar to be imbricated in the center of the device for controlling the gas flow of a second pair of nozzles orthogonal to the one shown in the figure. It may also be noted that the passage section offered to the gas flow during the movement periods of the bar is substantially constant.

FIG. 4 shows, in schematical form, one embodiment of the electro-pneumatic means for controlling the movement of the sliding bar 14 so as to close alternately the nozle throats 13a and 13b of the respective nozzles 11a and 11b. These electro-pneumatic means for controlling the sliding bar comprise:

an electro-pneumatic inverter 19, this inverter comprises an input connected to a pressurized gas source 20 and preferably to the gas source supplying the piloting nozzles, two outputs connected respectively to the input orifices 17 and 18 of cavity 16 inside which is placed piston 15 integral with the sliding bar 14, and two electro-magnetic actuators 19a and 19b, an electronic bistable latch 21 in which the Q and $\overline{Q}$ outputs are connected respectively to the inputs of the electro-magnetic actuators 19a and 19b, a clock circuit 22 which supplies a clock signal at the operating cycle frequency $H_c$ of the sliding bar, this clock circuit is connected to a first control input S of the bistable latch 21, a duration modulator 23, this duration modulator comprises a first input connected to the clock circuit 22, a second input which receives a signal Si representative of a piloting order and an output connected to a second control input R of the bistable latch 21.

FIG. 5 shows, in a simplified sectional view, another embodiment of the pneumatic means for reciprocally moving the sliding bar 14 already described. In this variant, the sliding bar comprises two pistons 15a and 15b whose section is such that the sum of the effective sections of each of the pistons is equal to the effective section of a single piston as described above. These two pistons 15a and 15b are freely housed in cavities 16a and 16b which are situated symmetrically on each side of the longitudinal axis X. This embodiment of the pneumatic means for moving the sliding bar 14 is more compact and frees a location which becomes available for housing a second sliding bar so as to control the differential gas flow to a second pair of nozzles as will be described subsequently. Each of these cavities 16a and 16b is provided with input/output orifices 17a, 17b and 18a, 18b which are connected in parallel in twos so as to supply a first 19 and a second 20 input/output orifices through which the fluid for controlling the pistons will flow. In addition, the sliding bar is provided with a stud 21 which is situated opposite a groove 23 formed in a fixed element 22 whose physical position is perfectly defined. These different elements form two stops for the sliding bar and prevent this latter from coming into contact with the wall of the gas ducts of the nozzles.

FIG. 6 shows, in a simplified sectional view, a second variant of the pneumatic means for driving the sliding bar 14. In this second variant, pistons 15a and 15b are situated on the same face of the sliding bar instead of being situated on the two opposite faces of this bar as previously described. The section of the pistons is not necessarily semi-circular in shape but may preferably be rectangular in shape which results in a constructional simplification of the pneumatic means and reduction of the space they occupy.

FIG. 7 shows, in a sectional view, one method of constructing a lateral gas jet piloting device whose component elements have just been described. This piloting device comprises two piloting planes, mutually orthogonal, in this figure one of the piloting planes will be more particularly considered, for example the piloting plane Y. The body of the piloting device is an element cylindrical in shape with diamter $\phi$ and orientated along longitudinal axis X, this body forms the piloting section of the guided missile considered here. Body 10 has means 10a and 10b for mechanical connection with the adjacent sections of the missile, these adjacent sections as described in FIG. 2 contain the generator of the pressurized gas flow. This body may be made from a light alloy and to this end it is equipped with side plates 24 and 25 whose function is to form a heat barrier as well as a connection joint between the adjacent sections of the missile. This body further comprises housings such as housing 26 for receiving the electrovalves for controlling the pneumatic means of the sliding bar and a gas filter 27 whose purpose is to purify the control fluid fed to the electrovalves. The body has therethrough, parallel to the longitudinal axis X, ducts such as duct 28; the function of these ducts is to ensure parallel operation of the two parts of the gas generator. The lateral nozzles 11a and 11b and their gas ducts are made from a low erosion material such a graphite. The sliding bar 14 comprises, one one of its faces, pistons 15a and 15b rectangular in section and this assembly is made from a high heat resistant material such as molybdenum. Cavities 16a and 16b for housing pistons 15a and 15b are machined from the graphite blocks which form the air ducts for the nozzles and these cavities, have inlet/outlet orifices 17a and 17b for the control fluid. The sliding bar is provided with its stop stud 21, which is housed in the groove 23 formed in the fixed element 22. The nozzles have closure means (not shown) for allowing adequate priming of the gas generator. These closure means are eliminated as soon as the value of the pressure of the gas reaches the nominal value of the combustion pressure. Finally, in this figure, there can also be seen a second sliding bar 29 associated with the pair of nozzles orientated in the piloting plane Z.

FIG. 8 relates to the preceding figure and shows a sectional view of the piloting device along the piloting plane Z. In this plane Z, the elements of the piloting device are identical with those described for the piloting plane Y, they comprise more particularly nozzles 11c and 11d, input orifices 12c and 12d of the gas ducts of the nozzles including the nozzle throats 13c and 13d; the sliding bar 29 which has pistons 30a and 30b and the stopstud 31 situated opposite the groove 32 formed in the fixed element 33. Pistons 30a and 30b are freely housed in the corresponding cavities 34a and 34b which are provided with their input/output orifices 35a,36a and 36b,36b.

FIG. 9 relates to the preceding figure and shows in a sectional view CC a form of constructing the electrovalves for controlling the pneumatic means for moving the sliding bars 14 and 29. The electrovalves, two in number, one for each of the pairs of nozzles, are of the slide-valve type and their longitudinal axis forms an angle of 45° with the piloting planes Y and Z. In this figure a single electrovalve 40 is shown, in detail, the second 41 being disposed symmetrically with respect to the axes of the device. An electrovalve comprises a cylindrical body 42 inside which slides an axial spool 43 whose position is conditioned by the excitation condition of two electro-magnets 44a and 44b. The body of the electrovalve has an input 45 connected to the gas filter 27, first 46 and second 47 outlets connected to the input/output orifices of the cavities of the pneumatic means for moving the corresponding sliding bar and third outlets 48a and 48b connected to gas ducts 49a and 49b which open outside. In this figure, two gas ducts 28a and 28b are disposed at 45° from the piloting planes Y and Z to provide correct parallel operation of the two parts of the gas flow generator.

The advantages provided by a piloting device in accordance with the invention may now be seen more clearly: the means for controlling the gas flow passing through the nozzles are extremely compact and the corresponding mechanical resonance frequency is high, thus allowing short response times, of the order of a tenth of a millisecond for missiles with a diamter $\phi$ of the order of 150 mm or more.

The invention is not limited in its characteristics to the embodiment described, exclusively by way of illustration, more especially the profile of the lateral nozzles may be modified depending on the slant of the gas jet, the form of the elements may be changed depending on the manufacturing processes used and the relative location of the elements in the body of the device may be different.

The lateral gas jet piloting device finds its application in guided missiles, missiles, rockets, bombs, in combination or not with an aerodynamic piloting system.

What is claimed is:

1. A lateral gas jet piloting device comprising:
    a housing;
    means in said housing defining a pair of mutually independent gas flow ducts, said ducts being mutually opposite a central portion of said housing, each of said ducts having one end communicating with a source of gas under pressure and another end defining a gas nozzle;
    a sliding bar in said housing, said sliding bar having ends extendable into a portion of each of said ducts, said bar being slidable in a direction transverse to gas flow in said ducts at said portions, the length of said bar being such that when one of said bar ends is in one of said ducts the other of said bar ends is not in the other of said ducts, said ends of said bar when in said ducts being shaped to present a nonaerodynamic surface to gas flow in said ducts for blocking said ducts, whereby said bar forms a bistable gas flow valve; and
    means for sliding said bar between two stable position wherein gas flow in one of said ducts is completely blocked.

2. The device of claim 1 wherein each said nonaerodynamic surface comprises a surface extending transverse to gas flow at said portion of said duct.

3. The device of claim 2 wherein said means for sliding comprise pneumatic means having two bistable positions.

4. The device of claim 3 wherein said pneumatic means comprise:
    a portion of said housing defining a hollow cylinder;
    piston means slidable in said cylinder and fixed to said bar; and means for selectively supplying pressurized gas to said cylinder on either side of said piston means.

5. The device of claim 4 including two of said pneumatic means positioned on opposite sides of a midpoint of said bar.

6. The device of claim 5 wherein said piston means are rectangular pistons.

7. The device of claim 5 including stop means fixed to said bar for preventing said ends of said bar from contacting a surface of one of said ducts upon closing said duct.

8. The device of claim 7 wherein said stop means comprises:

a groove in said housing; and a stud fixed to said bar and extending into said groove, stopping of said bar being provided by engagement of said stud with walls of said groove.

9. The device of claim 4 including stop means fixed to said bar for preventing said ends of said bar from contacting a surface of one of said ducts upon closing said duct.

10. The device of claim 4 comprising two of said devices having said bars spaced in said gas flow direction and having said nozzles oriented in mutually orthogonal planes.

11. The device of claim 1 comprising two of said devices having said bars spaced in said gas flow direction and having said nozzles oriented in mutually orthogonal planes.

* * * * *